United States Patent [19]
Brown, III et al.

[11] Patent Number: 5,239,621
[45] Date of Patent: Aug. 24, 1993

[54] PRINTER WITH FLASH MEMORY

[75] Inventors: John K. Brown, III; Joseph P. Kolb; Lynn M. Oliver, all of Lexington, Ky.

[73] Assignee: Lexmark International, Inc., Greenwich, Conn.

[21] Appl. No.: 904,612

[22] Filed: Jun. 26, 1992

[51] Int. Cl.⁵ .............................................. G06H 15/00
[52] U.S. Cl. .................................................... 395/115
[58] Field of Search ........ 395/115, 110, 101, 164–165, 395/112, 325, 500, 114, 113; 358/404, 444; 400/76, 61, 62, 69

[56] References Cited

U.S. PATENT DOCUMENTS

| | | | |
|---|---|---|---|
| 4,441,164 | 4/1984 | Pavan et al. | 395/115 |
| 5,048,771 | 9/1992 | Siering | 244/3.15 |

*Primary Examiner*—Arthur G. Evans
*Attorney, Agent, or Firm*—John A. Brady

[57] ABSTRACT

Flash memory (12) is added to a printer and fonts and macros received at connector (14) are stored under operator control. All data received is first processed under by the printer data processor controller (8) using dynamic memory (10). Printers which respond to more than one language store the downloaded information before termination of a language mode erases the DRAM.

14 Claims, 1 Drawing Sheet

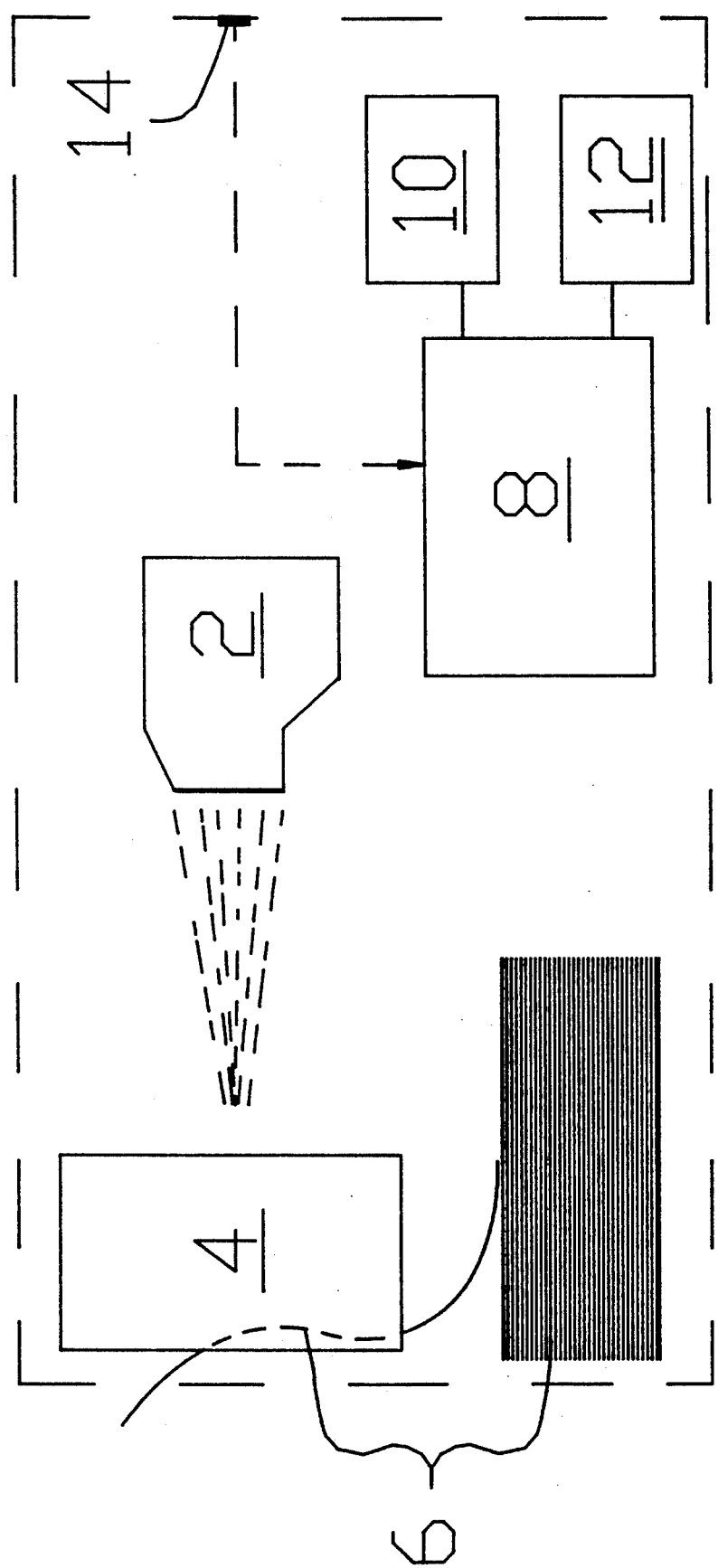

PRINTER WITH FLASH MEMORY

TECHNICAL FIELD

This invention relates to printers operated from internally stored electronic font information and data processing routines and capable of receiving by download from a separate data processor such font information and macros. (Macros are routines to control execution of specialized functions.)

BACKGROUND OF THE INVENTION

This invention provides the capability within the printer to save downloaded fonts and macros in a flash read only memory (ROM). With this invention no special data stream commands are required for downloading to the flash ROM. In existing printers, downloaded fonts and macros are lost when power is turned off since they are stored in dynamic random access memory (DRAM). DRAMs require continuing voltage input to store information.

Although reprogrammable permanent memories have been known in various forms, including somewhat recent miniature circuit designs, only the currently available memories denominated flash memories provide true equivalent size and functionality to DRAMs at acceptable cost.

Writing new control software into reprogrammable permanent memories has been widely practiced. U.S. Pat. No. 5,048,771 to Siering is cited as a recent, illustrative example.

DISCLOSURE OF THE INVENTION

In accordance with this invention, font and macro software is downloaded using existing data stream commands. The printer contains the existing DRAMs and software which requires preparation for use in the printer is prepared using the existing capabilities of the printer, including DRAM. In accordance with this invention an electronically erasable and reprogrammable read only memory (EEPROM) is provided, and the downloaded fonts and macros are selectively stored in that memory under operator control. Such control is by a control panel entry and by a special command sequence in the datastream.

Printers which have the capability of responding to different printing languages (such as ASCII and PCLS), are configured to store downloaded information at least before the existing mode is terminated, since termination would erase the content of the DRAM.

BRIEF DESCRIPTION OF THE DRAWING

The details of this invention will be described in connection with the accompanying drawing, in which the printer of this invention is shown illustratively.

BEST MODE FOR CARRYING OUT THE INVENTION

Except where specific to the flash memory or otherwise apparent or stated, the preferred printer in accordance with this invention is at least a printer of the form and functionality of the IBM LaserPrinter 4029, Model 10, which is designed, manufactured and sold commercially by the assignee of this invention.

As shown in the drawing, the printer has a laser printhead 2 operative through suitable electrophotographic apparatus 4 to fix a toner image to output paper 6. This is effected under control of a central electronic data processing unit 8, which stores data processing information in a DRAM 10. In accordance with this invention, at least one flash memory 12 is also provided in the printer. The flash memory is commercially available as a electronic circuit having no mechanical movement and of size to be connected directly within the printer in the manner conventional circuits are added to the printer. The printer has a cable connecting port 14 from which font software defining fonts different from that permanently stored in the printer may be downloaded to DRAM 10. Similarly, the, downloaded information may be a macro, which is a data, processing software routine to perform a specialized function.

FEATURES

This invention is intended to support an optional flash card feature on a printer. The printer microcode will support the following:

- During power on self test (POST), check for the presence of flash card features, and if found, verify header and file checksums. For an error in the card header, post the error to the front panel and provide the option of formatting the card. For checksum errors in individual file subheaders or if an incomplete file is detected, mark the file data type as deleted and post the error to the panel.
- ARCHITECTURAL NOTE: Internally there are two variables associated with each flash socket ... Flash installed and Flash valid are initialized as part of the POR process. Flash installed indicates that a flash card is installed in the memory feature connector. Flash valid indicates that the flash minimally contains a valid flash header. If the POR process is not able to indicate Flash valid for each installed flash, then an error is posted on the front panel during initialization and the operator is given the option of performing a low-level format of the flash.
- When flash card feature(s) are installed, the option is provided of formatting a card from the front panel or datastream.
- When flash card feature(s) are installed, the option is provided of selecting flash card fonts from the front panel or datastream. In PostScript language mode, flash card fonts are selectable only with PostScript operators and not from the front panel.
- The ability is provided to write scaleable fonts from PCL5 language, PPDS language, and PostScript language into the flash. PostScript language operation and PPDS language operation (PPDS is a well known form of ASCII language) access Type 1 fonts downloaded from either mode. PCL5 language operation will only access scaleable fonts downloaded via a PCL5 language datastream. PostScript language Type 3 fonts are not storable on the flash.
- The ability is provided to write bitmap fonts from PCL5 language and PPDS language datastreams. The minimum requirement is for each language operation mode to access its own downloads; however, sharing between the modes is enabled and supported where reasonably possible.
- The ability is provided to write macros from PCL5 language and PPDS language datastreams. Each language operation mode will access only its own macros.

Font printing in each language operation mode supports fonts resident on flash cards.

Additionally, an additional function of printing a directory of flash resources is be provided as a standalone function. Print directory will dump all information using PCL5 as an output language and will reset following completion. Directory listing information on the report will include:
amount of "Flash" used space
amount of "Flash" free space
filename and extensions of "Flash" files and filesizes
font names for font files

FLASH CARD CHARACTERISTICS

The flash cards plug into SIMM sockets and function as EPROM that is erasable under software control. When erased, the memory area appears as logical ones, and each bit location may be written to zeros independently of any other bit location. While each card may only be erased as a unit (the entire card at one time), any bit of the card may be written (changed from 1 to 0) at any time. Flash card memories having different operation restrains may be used by adapting the memory controls to such restraints.

FORMATTING PROCESS

The formatting process for a flash card is to erase the card to a uniform state of logical ones, followed by the creation of a valid card header. A 32-bit checksum is created and written as part of the card header, such that the checksum for the entire header, including the checksum field, yields 0. The low-level format function will be an operator requestable function from the front panel or requestable from the datastream.

Individual resources are not deletable once stored on the flash. However multiple copies of the same resource are allowed to exist. When this happens, the printer will use the last copy found.

FUNCTIONAL DESCRIPTION

Downloading to the flash is accomplished by using the existing font and macro download commands together with the Resource Destination and Control Command or front panel interaction.

Downloading may be intermixed with normal printer jobs, and may continue until insufficient free memory is available on the flash feature to complete the request. When this occurs, an out of memory condition is posted to the front panel, and the resource is left in DRAM memory 10. After clearing the error the operator will have the option of formatting the flash by selecting the format flash option from the test menu in order to make space available, but this will cause all resources present on the flash to be discarded. Individual fonts and macros may not be deleted from the flash card.

SEARCH ORDER

The following search order is used:
Postscript language operation (fonts)—RAM, Flash, Cartridge, Resident, Disk
PCL5/PPDS language operation (fonts and macros)—RAM, Flash, Cartridge, Resident

NOTE:

1. The flash card is searched at initialization of language operation mode and headers for valid fonts are loaded into DRAM 10.

2. Only the PostScript language operation supports use of disk memory.

IMPLEMENTATION

The implementation is best understood in relation to the datastream functionality defined below.

RESOURCE DESTINATION AND CONTROL COMMAND

This is a similar escape sequence to the set initial condition (SIC) command but for logical purposes, it is easiest to consider this as a separate command.

ESC [ K Ln Hn Mode PID Cmd

Where: Escape, bracket, K is a command designation LN is the low order length in bytes to follow in hexidecimal (value 1 to 256). HN is the second order length in bytes to follow in (hexidecimal range one to 256 counts, each having the value of 256 increments).

| Mode | Typically about eight codes defining the type of resets | Select initialization defaults |
|---|---|---|
| PID | 0xC0 | This ID distinguishes the command from a normal SIC. This is an arbitrary value. |
| Cmd | 0x31 (ASCII 1) | Begin Resource Collection |
| Cmd | 0x32 (ASCII 2) | End Resource Collection |
| Cmd | 0x46 (ASCII F) | Format the Flash. Do not affect Resource Collection Mode. |
| Cmd | 0x50 (ASCII P) | Set Password. |
| Cmd | 0x56 (ASCII V) | Verify Password. Additional Parameters (e.g. Target for Begin Resource collection, Format the Flash Cmds). |

BRIEF DESCRIPTION

Control of the flash is through the parameter: CMD. The only resources that are written to the flash are permanent fonts and macros in PPDS and PCL5 language operation, download codepages in PPDS language operation, and fonts defined with the DEFINE-FONT operator in PostScript language operation.

Some considerations that are common to all datastreams and resources:

1. If a resource is redundantly specified, then this resource may end up being redundantly present on the card. Other than following the process described below, the printer makes no explicit checks to avoid redundancy. Whenever, multiple copies of a resource exist on a flash, the last one downloaded is used.

2. All resources destined for flash memory are first loaded into RAM as an intermediate step. This is required to insure that the resource is completely defined before the write to flash occurs. If there is insufficient space on the flash for the resource, an error is posted and the resource is left in RAM memory until normal deletion occurs. When there is insufficient memory, no part of the resource is written to the flash memory.

3. Whenever this command is processed, the active page is printed as if a form feed command were received.

Now to consider specifically the PPDS and PCL5 language operation scenario first and then the PostScript language operation scenario.

PPDS/PCL5 LANGUAGE OPERATION SCENARIO

In PPDS and PCL5 language operation, all fonts and macros are downloaded into DRAM 10 via the defined datastream conventions. On the existing printers, there are events (e.g. operation mode switch) that clear DRAM 10 causing the resource to no longer be known to the printer control system. With flash memory installed and resource collection active, the resource is preserved on the flash memory before the memory is cleared, thus preserving the resource for future jobs.

The following events have been identified as events which cause the write to flash operation to occur.
 any SIC command (including fast SIC)
 turning resource collection mode off (either with the Resource Destination and Control Command or from the front panel).
 any operation mode switch The following apply to PPDS and PCL5 language operation modes.

1. RAM memory is used as in the existing printers to accomplish the download. Flash memory is unaffected until an event as defined above occurs.

2. Turning resource collection mode off with either the Resource Destination and Control Command or from the panel will write all permanent fonts and macros to the flash memory and reinitialize the printer control system.

3. Turning resource collection mode on in PCL5 or PPDS has no immediate effect on the resources in the printer or the active operation mode.

4. Turning resource collection mode off may result in writing some resources to flash memory that were actually downloaded before resource collection mode was turned on. This is a very desirable feature, in that it allows an operator to run their application initialization which downloads fonts and/or macros and then by just turning on and off the mode, all of the resources can be saved. This method of use is referred to as post-collection.

5. The ability to bracket (that is, turn the mode on, run the application, and then turn the mode off), referred to as bracket-collection is also supported and is useful for applications that download, use, and remove the resources without any intervention possible. 4019 and 4029 applications that SIC back to user defaults at the end of their job are examples of applications where bracket collection may be required.

6. If a RAM resource is deleted via datastream command, before a flash-writing event occurs, then this resource will not be written to flash when the flash-writing event does occur. Attempts to delete resources stored on flash memory are ignored.

7. When collection mode is turned on, it will remain active for all language operation modes.

8. SIC commands do not affect the state of Resource Collection.

POSTSCRIPT LANGUAGE OPERATION SCENARIO

The PostScript language operation scenario is somewhat different than that for PCL5 and PPDS language operation in that the PostScript language does not really employ a consistent concept of a permanent resource. However, since fonts are generally defined with the definefont operator, the functionality of the operator can be extended to utilize the flash memory.

When resource collection mode is on in PostScript language operation, and a definefont operator is executed, the font defined is written to flash. The resource is not removed from DRAM memory 10 however until another operator (e.g. restore) or other memory-clearing event occurs. Having the font remain in DRAM 10 (PostScript Language Virtual Memory) ensures that the job that downloaded the font will function appropriately. Only Type 1 fonts will be written to flash. There is no support for Type 3 fonts.

The flash definition of the font is not immediately made known to the PostScript language operating system. Flash resources are made known to the operating system at initialization of the operating system. This initialization occurs after every PostScript language end of job (CTRL-D) control code or whenever PostScript language is selected as an operating mode (e.g. from the datastream, by SIC or by front panel operation).

The following are applicable to PostScript mode.

1. The RESOURCE DESTINATION AND CONTROL COMMAND is only parsed and effective on PostScript language job boundaries (e.g. after the end of job (X'04', CTRL-D)) control code.

2. Resource Collection can be turned on and off at any time in a PostScript language job from the control panel.

3. Bracket collection is the only collection mode allowed in PostScript language operation. Because the write to flash memory actually occurs as part of the definefont processing, post-collection will not work.

4. When Resource Collection is on, Ctrl-D's always cause a full initialization of the Postscript language operating system.

RESOURCE DESTINATION AND CONTROL COMMAND EXAMPLES EXAMPLE 1

Activating Resource Collection

ESC [K 0x03 0x00 0x01 0x32 1

This command activates resource collection mode with the target being the first (or only) flash installed in the printer.

NOTE: In systems that support more than one Flash feature simultaneously, Target must be specified when activating resource collection mode. Otherwise, its not required.

EXAMPLE 2

Deactivating Resource Collection

ESC [K 0x03 0x00 0x01 0x32 2

This command turns off resource collection mode independent of which target is specified for the resources.

NOTE: Target is ignored when resource collection mode is being turned off.

EXAMPLE 3 Formatting a Flash

ESC [K 0x04 0x00 0x01 0x32 F

This command does not affect the current state of resource collection, but will cause the flash memory to be formatted.

PASSWORDS

The ability to set flash memory passwords is provided through the datastream. A new flash does not have a password and the use of passwords is not required. However, in "hostile" environments (e.g. college campus networks), a network administrator may desire to protect the flash memory from being inadvertently formatted. For this reason, the password security option is provided.

Using the password security option is simple. The following discussion indicates how to set the password (using the P command of the Resource Destination and Control) and then how to use the V command to enable and disable write-protection of the flash.

SETTING A PASSWORD

To set a password, use the Resource Destination and Control Command (subcommand P). The password can be one to eight bytes and is specified immediately after the P command. The count should include the password. The password is written to the flash and once written, verification is required be fore the flash contents can be modified. The following example would be used to change the Flash password to pass.

ESC [K 0x07 0x00 0x01 0x32 P p a s s

Once a password has been established for a flash, a flash is write-protected. To remove write-protection, verification must be done before any modifications can be made to the flash. The flash menu functions (e.g. format, download target) will not be accessible on the front panel when the flash is write-protected. The only subcommand of the Resource Destination Command that is processed is the V subcommand when the flash is write-protected.

REMOVING WRITE-PROTECTION BY VERIFYING THE PASSWORD

After a password has been established for a flash, the flash is write-protected until a verify operation is performed. When a flash is write-protected, it can not be formatted or appended to. Both datastream and front panel requests are locked out when the flash is write-protected.

To perform a verify operation use the V subcommand of the Resource Destination and Control command. The password immediately follows the V and the bytes of the password are included in the count for the command.

The following command sequence is used to verify the password set above.

ESC [K 0x07 0x00 0x01 0x32 V p a s s

CHANGING THE PASSWORD

It is not recommended to change the password. The password is stored in a file on the flash and space is used on the flash each time a new password is set. The space can only be recovered by formatting the flash and this process causes the loss of all resources stored on the flash.

To change the password, you must first verify the old pass word and then set the new password. Passwords can only be set when the flash is not write-protected.

FLASH CARD FORMAT

The flash card is organized as a card header and a series of files. Each file consists of a file header and data. The header and each subheader start with a length field, which is used in chaining from file to file. New files are written immediately following the previous last file.

FLASH CARD HEADER

| Field | Length | Data Type | Brief Description |
|---|---|---|---|
| Header Length | 4 bytes | Integer | Length of the Header |
| CheckSum | 4 bytes | Integer | Checksum for feature header |
| Visual | 4 bytes | Character | Must be 'Feat' |
| Part Number | 8 bytes | Character | Part Number in ASCII |
| Card Name | 24 byte | Character | Card Name in ASCII (null terminated) |
| Memory Size | 4 bytes | Integer | Amount of memory on feature (bytes) |
| Memory Speed | 1 byte | Integer | 0-255 10's of nanoseconds |
| Card Technology | 1 byte | Bit Field | A bit value of 0 = true<br>bit 7 - ROM<br>bit 6 - Pre-programmed EPROM<br>bit 5 - Customer programmed EPROM<br>bit 4 - Programmed RAM<br>bit 3 - Flash<br>bit 2-0 - Reserved |
| Release Level | 1 byte | Character | Release Level Attribute |
| Feature Position | 1 byte | Bit Field | Feature positions that this feature may be plugged into<br>0 = all positions are valid<br>1-255 = valid position number |

FILE HEADER

| Field | Length | Data Type | Brief Description |
|---|---|---|---|
| Length | 4 bytes | Integer | Length of the file header and data |
| CheckSum | 4 bytes | Integer | Checksum for file and file header |
| Visual | 4 bytes | Character | Must be "FILE" |
| Data Type | 2 bytes | Integer | 0 = Deleted<br>1 = Type 1 Font<br>2 = Bitmap Font<br>3 = Compugraphic Font<br>4 = Macro<br>5 = PostScript Program<br>6 = Executable Code<br>7-FFFF = Reserved |
| Datastream | 2 byte | Bit Field | 0 indicates valid for given datastream<br>bit 15-4 Reserved<br>bit 3 - GL (possible future use)<br>bit 2 - PostScript<br>bit 1 - PCL5<br>bit 0 - PPDS |
| Offset to data | 4 bytes | 32-Bit Integer | This allows for a length filename. If a filename is not specified, then this field will be 0x00000000.<br>Architectural note: Filenames are required for using the File Subsystem manager. |
| Filename | Variable | Character | filename.ext in ASCII (must be null-terminated) The filenames are internally generated and adhere to conventions of the File Subsystems manager. |

The length of the file header and data can be any size. The next file will start on a four byte boundary. The pad bytes added to force this will be included in the checksum of the current file.

FILE DATA

File Data immediately follows the file header and is operation mode and object specific The following types need to be defined:

Type 1 Scaleable Font

Type 1 fonts will be stored in the same format being used for resident and card fonts. This format will be accessed by PostScript and PPDS language operation. Accessing the fonts in either mode requires insignificant use of printer RAM (i.e. the format is accessible without significant data translation).

Compugraphic Scaleable Font

This format is being accessed only by PCL5 language operation. Accessing PCL5 language fonts from flash requires insignificant use of printer RAM, that is the format is accessible without significant data translation.

PCL5 Language Bitmap Font

These fonts are stored in IBM 4029 LaserPrinter card format. This format will be accessed by PPDS language operation and optionally shared by PCL5 language operation.

PCL5 Language Macro

This format will be accessed only by PCL5 language operation.

PPDS Language Bitmap Font

This format will be accessed only by PPDS language operation.

PPDS Language Macro

This format will be accessed only by PPDS language operation.

DATA WRITING CONSIDERATIONS

The following conventions are adhered to by the internals of the printer microcode.

1. There is no directory of files (per se) explicitly on the flash memory operation. In essence, the flash memory operation contains a chain of files. New files should always begin with the first free space on the flash.
2. File writing is never terminated by memory full. The resource size is exactly known and memory availability is checked before any write to the flash memory option actually occurs.
3. When new files are created in the memory operation feature, the length and checksum are the last fields written. There is a desire that the rest of the data be written sequentially, so that in the case of interruption, (e.g. power failure), minimal space is wasted.
4. As part of the power-up sequence, the header and all files (except deleted files) are checksum tested. All free space on the flash is checked to verify that it is unprogrammed. If any written data is found in the free space, then a deleted file is created and a flash memory error is posted. This ensures that errors in the flash are detected in the most timely fashion.

EXAMPLES

PPDS Bracket Collection

In this example, WordPerfect application software with a driver to the existing printer is used to write downloaded fonts to the flash memory 12. The following actions are used to accomplish this.

1. The printer is set to PPDS language operation mode with resource collection mode turned on.
2. Using the print driver Edit facility in WordPerfect, software, the fonts in the print driver that are desired to be installed on the flash are marked with a *. The WordPerfect Font Utility may be used to add fonts to the list.
3. Invoke the "Initialize Printer" function, to send the marked fonts to the printer.
4. When WordPerfect application is finished, turn resource collection mode off. The downloaded fonts are now copied over to the flash card. Printer initialization is no longer required in order to use these fonts.

PPDS Language Post Collection Using LaserDriver

In this example, existing control software for the existing printer, termed Laserdriver, is used to download the fonts to the printer. The fonts are post-collected. (In other words, resource collection is not active while the fonts are being sent to the printer.)

1. Use Laserdriver software to set the operation mode and download any fonts that are wanted.
2. Using the front panel, set Download target to flash, and then back to DRAM. This will cause all of the permanent downloaded fonts to be copied to the flash memory. Optionally, (if implemented), Laserdriver can be used to do this step.

Bracket Collection In PPDS Mode

In this example, assuming an application or a pre-existing flat file (ready to run file) is being used, the application or flat file does the following without possibility of the operator inserting a Post Collection command.

1. SIC to PPDS
2. Download fonts and/or macros
3. SIC to User Defaults

If PCL5 language operation is the printer's default mode, then post-collection will not work because the SIC at the end of the job that changes operation modes would erase all of the downloaded resources from memory. This is a job for Bracket Collection. The following steps will get the resources stored to the flash card.

1. From the datastream turn resource collection on or the front panel is used to set download target to flash.
2. Run the application or copy the flat file to the printer. When the mode change occurs at the end of the job, any permanent fonts or macros that have been downloaded (and still exist in the printer) will be saved on the flash memory 12.
3. Turn off collection mode. Since the resources have already been saved, this will have no effect other than on future resources.

Collecting Resources From Multiple Applications, Datastreams, and Users.

This is very beneficial to LAN Administrators. It is require some cooperation among the LAN users.

For this example, a LAN with 3 users—A, B, and C. A likes WordPerfect software and uses PPDS language and some Type 1 fonts that he/she likes to download into the printer. B uses Postscript language and he/she has a different set of fonts that he/she uses. C uses PCL language and has some forms that he/she uses that are PCL language macros. Without flash memory, their jobs always take longer to print because of the setup. If they must set up the printer at the beginning of every job, because whenever the printer changes language operation mode it loses their previous setup.

A, B, and C install a flash memory on their printer. To program the flash memory, here's all they need to do.

1. Turn Resource Collection on.
2. Each sends their setup to the printer downloading their fonts and macros. Note this is the same setup they used before. No change required.
3. When all have finished, they turn resource collection off.
4. They do a print directory, and they each see that their fonts and/or macros are stored on the flash.
5. A, B, and C now simply share the printer because they don't have to send the setup to the printer any more, just their print jobs.

We claim:

1. A printer comprising temporary-storage random access memory used for normal printing by said printer, means to receive downloaded font or macro software, means to prepare said downloaded software for normal use in printing by said printer, means to store said prepared downloaded software in said temporary memory, random access electronic circuit electronically erasable and programmable read only memory, a data processor control unit, selection means operative with said control unit having a first status in which said control unit will transfer said prepared downloaded software from said temporary memory to said EEPROM and a second status in which said control unit will not transfer said prepared downloaded software from said temporary memory to said EEPROM and means to receive control signals from external of said printer to bring said selection means to said first status or to said second status.

2. The printer as in claim 1 in which said control unit under control of said selection means operates to transfer said font or macro software upon termination of a language operation mode of said printer.

3. The printer as in claim 2 in which said selection means has a third status, said third status including said first status, and said control unit under control of said selection means in third status, operates to transfer said font or macro software received by said printer after said selection means is brought to said third status and also comprising means to receive control signals from external of said printer to bring said selection means to said third status.

4. The printer as in claim 1 having a PostScript language operating mode and in which said control unit under control of said selection means during operation in said PostScript language operation mode operates to transfer said font immediately in response to a define-font operator received by said printer.

5. A printer responsive to data received in at least two printer languages, said printer responding to each of said languages when set to a predefined operation mode for that language, said printer comprising a temporary-storage random access memory used for normal printing, means to receive downloaded font or macro software, a random access electronic circuit electronically erasable and programmable read only memory (EEPROM), a data processor control unit, selection means operative with said control unit having a first status in which said control unit will transfer said downloaded software rom said temporary memory to said EEPROM and a second status in which said control unit will not transfer said downloaded software from said temporary memory to said EEPROM, means to receive control signals from external of said printer to bring said selection means to said first status or to bring said selection means to said second status, and means effective upon termination of said printer being in a said mode and said selection means being in said first status to execute said transfer of downloaded software to said EEPROM.

6. The printer as in claim 5 in which said selection means has a third status, said third status including said first status, and said control unit under control of said selection means in said third status, operates to transfer said font or macro software received by said printer after said selection means is brought to said third status and also comprising means to receive control signals from external of said printer to bring said selection means to said third status.

7. The printer as in claim 5 having a PostScript language operating mode and in which said control unit under control of said selection means during operation in said PostScript language operation mode operates to transfer said font immediately in response to a define-font operator received by said printer.

8. The printer as in claim 1 in which said downloaded software is font software.

9. The printer as in claim 2 in which said downloaded software is font software.

10. The printer as in claim 3 in which said downloaded software is font software.

11. The printer as in claim 4 in which said downloaded software is font software.

12. The printer as in claim 5 in which said downloaded software is font software.

13. The printer as in claim 6 in which said downloaded software is font software.

14. The printer as in claim 7 in which said downloaded software is font software.

* * * * *